United States Patent [19]

Euvrard et al.

[11] 4,338,483

[45] Jul. 6, 1982

[54] ELECTRICAL POWER TRANSMITTING INSTALLATION INCLUDING A SAFETY DEVICE FOR PROVIDING PROTECTION AGAINST THE EFFECTS OF ELECTRIC ARCS

[75] Inventors: Jean-Paul Euvrard, Tassin-la-Demi-Lune; Gilles Voisin, Lyons, both of France

[73] Assignee: Alsthom Atlantique, Paris, France

[21] Appl. No.: 219,653

[22] Filed: Dec. 24, 1980

[30] Foreign Application Priority Data

Dec. 28, 1979 [FR] France ................. 79 31981

[51] Int. Cl.³ .................... H02G 5/06; H01B 9/04
[52] U.S. Cl. ........................... 174/28; 174/21 C
[58] Field of Search ............ 174/16 B, 21 C, 22 C, 174/28, 99 R, 99 B; 361/1

[56] References Cited

U.S. PATENT DOCUMENTS

| | | | |
|---|---|---|---|
| 3,814,831 | 6/1974 | Olsen | 174/28 |
| 3,931,451 | 1/1976 | Durschner et al. | 174/28 X |
| 4,074,064 | 2/1978 | Muller et al. | 174/28 |
| 4,090,028 | 5/1978 | Vontobel | 174/28 X |

FOREIGN PATENT DOCUMENTS

| | | | |
|---|---|---|---|
| 2710843 | 9/1978 | Fed. Rep. of Germany | 174/28 |
| 54-155440 | 12/1979 | Japan | 174/99 R |

Primary Examiner—Laramie E. Askin
Attorney, Agent, or Firm—Sughrue, Mion, Zinn, Macpeak, and Seas

[57] ABSTRACT

The invention relates to an installation for transmitting electrical power which includes a safety device for providing protection against the effects of electric arcs, said installation including a metal casing (5) filled with a dielectric gas under pressure and having a coaxial central conductor (1,2). In such an installation, where a conductor (1,2) and a casing (5) are held in position relative to each other by a transverse insulator (8), said safety device comprises a tubular electrode (9) situated close to the casing (5) and to the insulator (8) and upstream therefrom relative to the direction of power transmission. The tubular electrode is electrically connected to the casing (5) by conductors (12) which are disposed at a small number of points around its periphery. The invention applies to protecting high-tension electric installations contained in metal casings.

8 Claims, 5 Drawing Figures

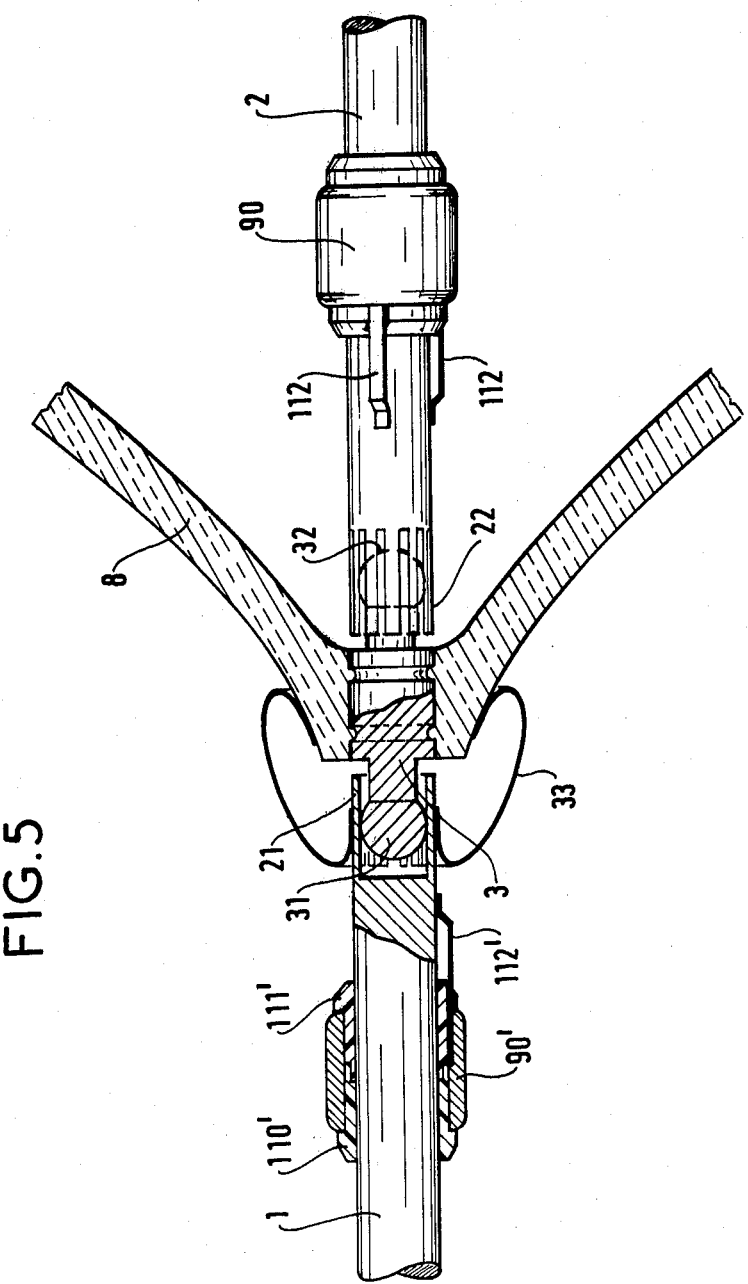

ELECTRICAL POWER TRANSMITTING INSTALLATION INCLUDING A SAFETY DEVICE FOR PROVIDING PROTECTION AGAINST THE EFFECTS OF ELECTRIC ARCS

This invention relates to a safety device in the kind of electric installation that includes an electric conductor contained in a metal casing filled with dielectric gas under pressure for providing protection against the effects of electric arcs such as may occur in the installation.

BACKGROUND OF THE INVENTION

In such high-tension electric installations, a high-intensity fault arc, e.g. of several tens of thousands of amps lasting a few tenths of a second, develops a high pressure due to heating inside the casing. The destructive effects of this pressure can be avoided by safety valves or diaphragms. Under the effect of the rise in the gas pressure due to this heating the arc tends to become stabilized at some points, and in particular near insulators, once the arc reaches them. The heat at the base of the arc then locally weakens the casing by melting. This phenomenon combined with the pressure may lead to perforation of the casing. To avoid this, it is known, e.g. through published French Pat. No. 2,217,839 and corresponding U.S. Pat. No. 3,931,451, to provide electrodes made of arc-resistant material at the points where the arc fixes itself. Said materials are not subjected to the pressure and therefore protect the casing.

Another means consists in making the arc rotate rapidly so as to reduce local heating. On this subject, reference should be made to published French patent No. 2,403,669 and corresponding U.S. Pat. No. 4,090,028 which uses the magnetic field set up by one or several turns which are electrically insulated except at one end which is connected to the casing in a zone where the arc is prevented from moving.

However, this kind of protection requires bulky devices at the cost of smaller insulator diameter or increased insulator dielectric stress.

Preferred embodiments of the present invention provide a compact device which is simple to manufacture and sets up an impenetrable barrier against arcs, making the arcs unstable and thereby preventing holes from being formed in a casing.

SUMMARY OF THE INVENTION

The invention relates to a installation for transmitting electrical power which includes a safety device for providing protection against the effects of electric arcs, said installation including a metal casing filled with a dielectric gas under pressure, and having a coaxial central conductor, said casing and said conductor being held in position relative to each other by a transverse insulator, said safety device comprising a tubular electrical and thermal insulator and a tubular electrode situated close to the transverse insulator and upstream therefrom relative to the direction of electrical power transmission, said tubular electrode being held concentric with the casing and being separated therefrom by an electrical and thermal insulator and being electrically connected to said casing by conductors distributed around the electrode at a small number of points and extending from the electrode towards the transverse insulator.

Preferably, a second tubular electrode is concentric with the central conductor and separated therefrom by a second tubular electrical and thermal insulator, said second tubular electrode being situated close to the transverse insulator and upstream therefrom relative to the direction of electrical power transmission, said second tubular electrode being electrically connected to the central conductor by conductors distributed around the second electrode at a small number of points and extending from the second electrode towards the transverse insulator.

The or each tubular electrode may be formed from a flat strip with rounded edges and of width less than 20% of the radius of curvature of the casing. Advantageously, said tubular electrical and thermal insulator is formed in the shape of a ring constituted by overlapping components fitted into each other. In a variant, the or each tubular electrode is constituted by arcuate portions of tube with each portion individually connected to said metal casing or said coaxial central conductor as the case may be.

BRIEF DESCRIPTION OF THE DRAWINGS

Embodiments of the invention are described by way of example with reference to the accompanying drawings.

FIG. 5 illustrates a partial cross-section on a larger scale of the connection of the conductors in a variant of the installation.

DESCRIPTION OF PREFERRED EMBODIMENT

Figure 1:
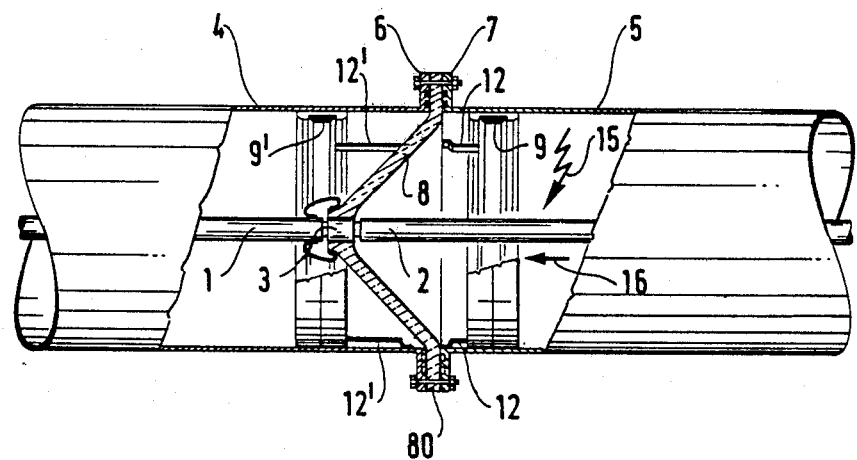
FIG. 1 is a partially cut away schematic illustration of an installation including a safety device in accordance with the invention.
Figure 2:
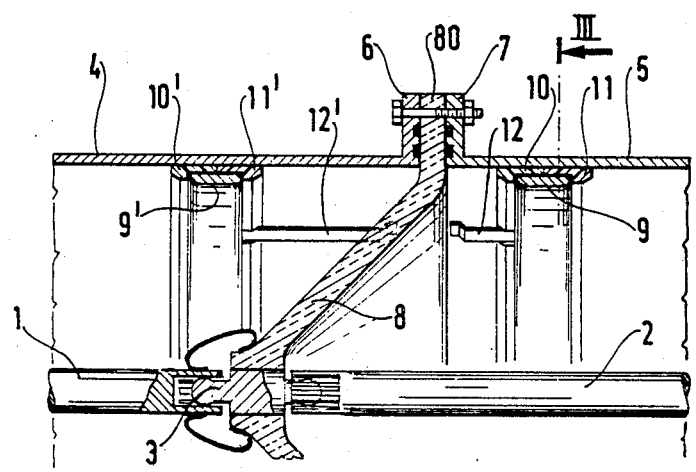
FIG. 2 is a schematic partial illustration on a larger scale of the installation shown in FIG. 1.
Figure 3:
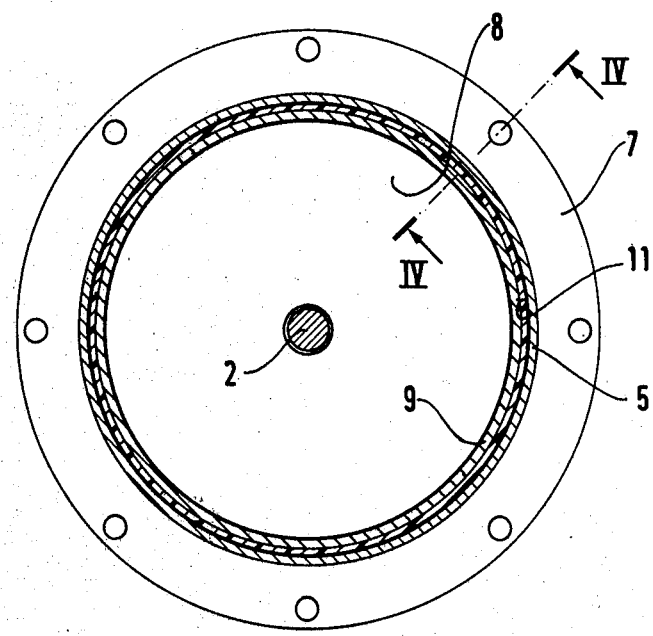
FIG. 3 illustrates a cross-section along line III of FIG. 2.
Figure 4:
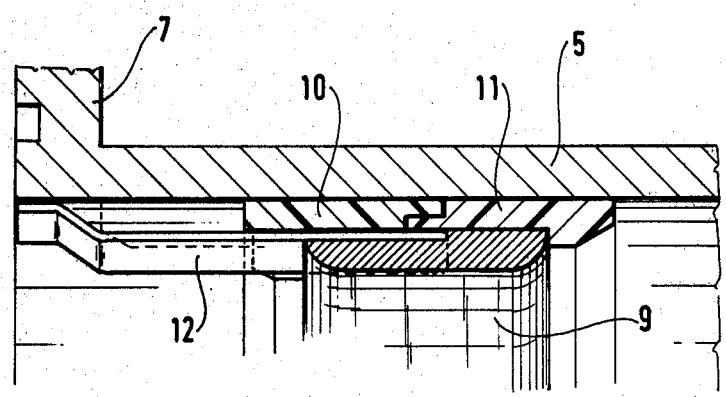
FIG. 4 illustrates a partial cross-section along line IV—IV of FIG. 3.

In FIGS. 1 to 4, conductors 1 and 2 are disposed coaxially in metal casings 4 and 5 filled with dielectric gas such as sulphur hexafluoride. Connecting flanges 6 and 7 are bolted together on the adjacent ends of the casings 4 and 5. The conductors 1 and 2 are connected together via a connection member 3 and are held inside the casings 4 and 5 by a conical insulator 8 with a collar 80 clamped between the flanges 6 and 7.

Tubular electrodes 9 and 9' with rounded edges are disposed on either side of the insulator 8, close thereto and close to the casings 5 and 4. The electrodes 9 and 9' are held concentrically to the casings 5 and 4 by half rings such as 10 and 11 interposed between the electrodes 9 and 9' and the casings 5 and 4. The outside diameter of the half rings is the same as the inside diameter of the casings.

The half rings 10 and 11, which are made of an electrically and thermally insulating material, are assembled together e.g. by glueing, clamping or screwing. The electrodes 9 and 9' are connected to the casings 5 and 4 by conductors such as 12 and 12' at a small number of points regularly spaced apart around the peripheries of the casings. In the example illustrated in the figures, the number of conductors is three, spaced at 120 degrees from one another around the casing and disposed between the electrode 9 and the insulator 8.

The device operates as follows. With the power transmitted by the installation flowing in the direction of arrow 16, when an arc 15 occurs between the casing 5 and the conductor 2, a loop is set up which makes the arc move very rapidly from right to left in the figure under the effect of Lorentz forces.

The arc fixes itself to the electrode 9 located on its path and the current flows in a generally assymmetrical way towards the casing 5 via the conductors 12 which, with the arc, form loops which prevent the arc from going beyond the electric barrier constituted by the electrode 9 and destabilizes the arc due to the assymmetrical distribution of the current. The base of the arc therefore remains on the electrode 9 round which it turns rapidly, thereby preventing excessive local heating. Further, the heat dissipated on the electrode 9 is not transmitted to the casing 5, protected as it is by the thermal insulation of the rings 10 and 11. If, in the installation, power passes in the reverse direction to that of the arrow 16, the arc moves the other way and reaches the electrode close to the insulator which is downstream from it.

If the power is likely to flow in either direction, as in the case of an interconnection set, the other electrode 9' supported by its half rings 10' and 11' and connected by its conductors 12' to the casing 4 must be provided on the other side of the insulator 8. In contrast, if the direction of power flow is one-way, only one electrode 9 need be placed near each insulator 8, on the power flow upstream side thereof.

The edges of the electrodes 9 and 9' are rounded or take any other shape which does not disturb the electric field, and the conductor 12 is connected to the electrode 9 on the electrode's edge for the same reason. The half ring 10 may be longer axially and provide electrical and thermal insulation for the conductors 12 as illustrated in dashed lines in FIG. 4.

The electrodes can be made of any conductive material, e.g. aluminium or aluminium alloy or copper. They can be formed from a flat strip with rounded edges whose width is less than 20% of the radius of curvature of the casing.

For practical assembly reasons, the loop electrode can be replaced by several electrode portions, the conductors 12 being placed at the ends of these electrode portions.

FIG. 5 illustrates in greater detail the connection member 3 which is fixed through the insulator 8 and connects the conductors 1 and 2 together. For this purpose, the ends of the connection member 3 have knee joints 31 and 32 which are inserted in connection sockets 21 and 22 with which the ends of the conductors 1 and 2 are equipped.

In addition to the previously described safety device, second tubular electrodes 90 and 90' may similarly be disposed around the conductors 2 and 1 and connected thereto by conductors such as 112 and 112' which are evenly spaced out around these conductors. The electrodes are held by half rings 110 and 111 and 110' and 111' analogous to the half rings 10 and 11 and 10' and 11'.

An anti-glow discharge hood 33 disposed around the connection between the conductor 1 and the connection member 3 provides protection against potential gradients developed by the sharp edges of live parts which are near the nose of the conical insulator 8.

We claim:

1. An installation for transmitting electrical power which includes a safety device for providing protection against the effects of electric arcs, said installation including a metal casing filled with a dielectric gas under pressure, and having a coaxial central conductor, said casing and said conductor being held in position relative to each other by a transverse insulator, said safety device comprising a tubular electrical and thermal insulator and a tubular electrode being situated axially close to the transverse insulator and upstream therefrom relative to the direction of electrical power transmission, said tubular electrode being held concentric with the casing and being separated therefrom by said tubular electrical and thermal insulator, and said tubular electrode being electrically connected to said casing by conductors distributed around the electrode at a small number of points and extending from the electrode towards the transverse insulator.

2. An installation according to claim 1, including a second tubular electrical and thermal insulator and a second tubular electrode, said second tubular electrode being concentric with the central conductor and separated therefrom by said second tubular electrical and thermal insulator, said second tubular electrode being situated axially close to the transverse insulator and upstream therefrom relative to the direction of electrical power transmission, said second tubular electrode being electrically connected to the central conductor by conductors distributed around the second electrode at a small number of points and extending from the second electrode towards the transverse insulator.

3. An installation according to claim 2, wherein each tubular electrode is formed from a flat strip with rounded edges and of width less than 20% of the radius of curvature of the casing.

4. An installation according to claim 2, wherein each tubular electrical and thermal insulator is formed in the shape of a ring constituted by overlapping components fitted into each other.

5. An installation according to claim 2, wherein each tubular electrode is constituted by arcuate portions of tube with each portion individually connected to its respectively associated metal casing and coaxial central conductor.

6. An installation according to claim 1, wherein said tubular electrode is formed from a flat strip with rounded edges and of width less than 20% of the radius of curvature of the casing.

7. An installation according to claim 1, wherein said tubular electrical and thermal insulator is formed in the shape of a ring constituted by overlapping components fitted into each other.

8. An installation according to claim 1, wherein said tubular electrode is constituted by arcuate portions of tube with each portion individually connected to said metal casing.

* * * * *